United States Patent Office 3,150,747
Patented Sept. 29, 1964

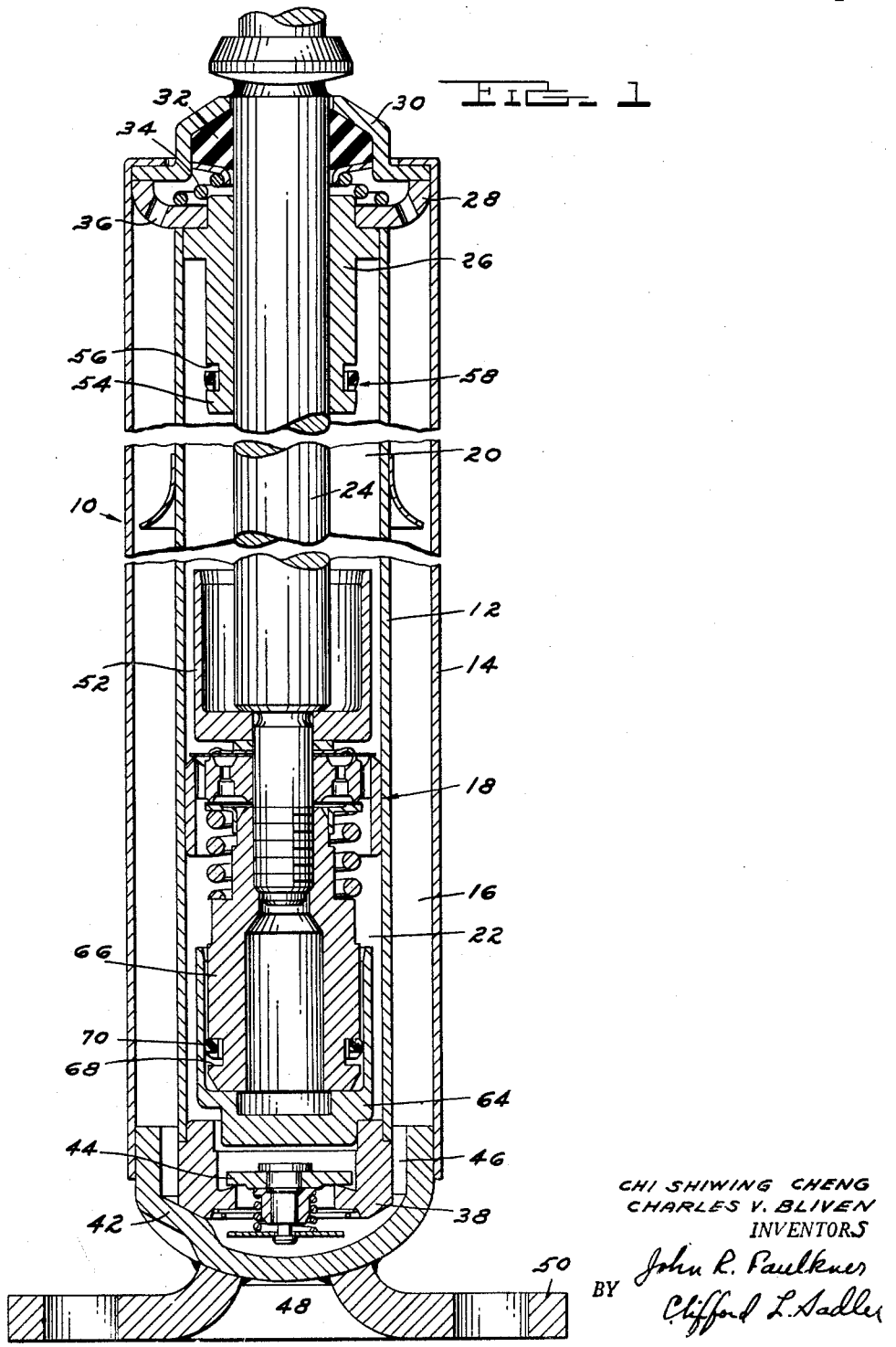

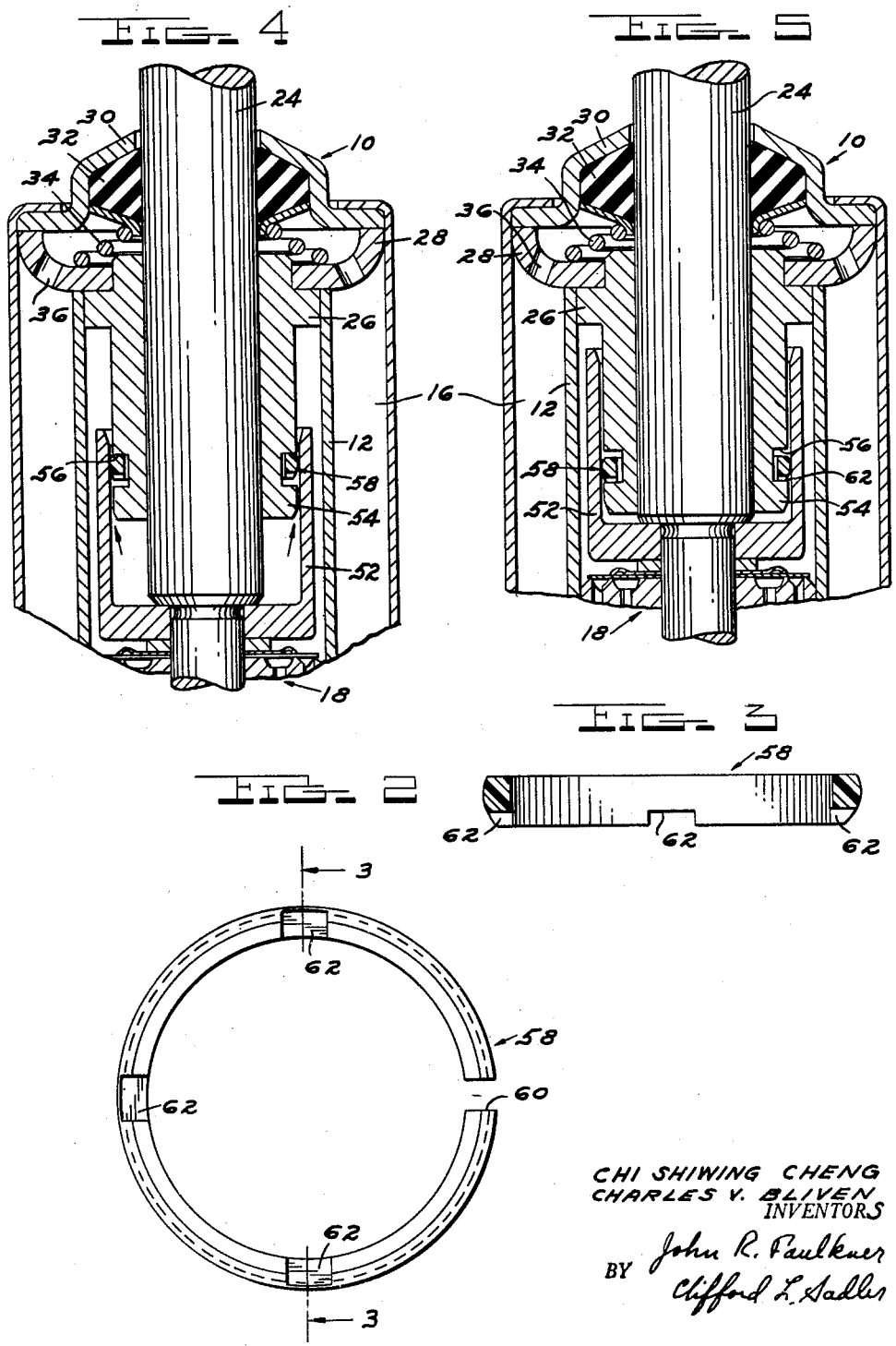

3,150,747
HYRAULIC SHOCK ABSORBER HAVING
HYDRAULIC STOP MEANS
Charles V. Bliven, Belleville, and Chi Shiwing Cheng,
Dearborn, Mich., assignors to Ford Motor Company,
Dearborn, Mich., a corporation of Delaware
Filed June 30, 1961, Ser. No. 121,033
4 Claims. (Cl. 188—88)

The present invention relates to hydraulic shock absorbers and more particularly to a shock absorber having integral hydraulic motion limiting means.

The conventional shock absorber contains a pressure tube and a piston which traverses the length of the tube. Valving is provided in the piston and at the foot of the pressure tube for controlled fluid flow to dampen relative movement of unsprung and sprung vehicle suspension components with which the shock absorber unit is associated.

To accommodate extreme suspension deflections, external rubber bumpers are usually provided. The bumpers prevent damaging metal to metal contact of the piston with the head and foot closures of the pressure tube.

The unique shock absorber of the present invention proposes the eliminations of these rubber bumpers by providing hydraulic means integral with the shock absorber mechanism to arrest extreme jounce and rebound deflections.

More specifically the present invention provides in a shock absorber, a cup-shape member which telescopically receives a second member to create a hydraulic stop by trapping fluid in a chamber defined by the two members and from which there is an escape path of restricted area.

It is a further object of the present invention to provide a novel sealing ring used in conjunction with the telescoping members to resist the escape of fluid from the hydraulic stop chamber but is adapted to permit the ready replenishing of fluid to the chamber upon reverse motion.

These and further objects of the present invention will be amply apparent from the following description and the accompanying drawings in which:

FIGURE 1 is an elevational view in section of a shock absorber constructed in accordance with this invention;

FIGURE 2 is a plan view of the sealing ring;

FIGURE 3 is a sectional view taken along section lines 3—3 of FIGURE 2, and;

FIGURES 4 and 5 are enlarged views disclosing the hydraulic stop mechanism at the height of extreme rebound.

Referring now to the drawings wherein the presently preferred embodiment of this invention is disclosed, FIGURE 1 shows a plunger type shock absorber unit 10.

The shock absorber unit 10 has a pressure tube 12 and a reservoir tube 14 which define an annular reservoir chamber 16. Slidably received within the pressure tube 12 is a valved piston 18 that divides the interior of tube 12 into a rebound pressure chamber 20 and a compression pressure chamber 22 situated above and beneath the piston 18 respectively.

The valved piston assembly 18 is secured to the end of a piston rod 24 which in turn is attached to a sprung vehicle component such as a body member.

A head piece 26 slidably receives the piston rod 24 and seals the upper end of the pressure tube 12. The head 26 is positioned relative to the pressure tube 14 by a washer like stamping 28. Member 30 closes the end of the reservoir tube 14 and is positioned by a turned-over edge formed on the end of that tube. An elastomeric seal 32, seals the end of the unit and is retained in position by a coil spring 34. Ports 36 are provided in the member 28 to permit the return flow of fluid from the area of the spring 34 back to the reserve fluid chamber 16.

The lower end of the pressure tube 12 is sealed by a base member 38 that is secured to a cup-shaped closure piece 40. The closure 40 seals the lower end of the reservoir tube 14 and has several inward protrusions 42 to position the base piece 38.

The base member 38 contains a foot valve assembly 44 that permits the replenishing of fluid to the compression chamber 22 from the reserve chamber 16 during a rebound stroke and for the controlled expulsion of fluid from the compression chamber 22 to the reserve chamber 16 during the compression stroke. Clearance is provided at 46 between protrusions 42 to permit the flow of fluid from the reservoir 16 to the area 48 beneath the foot valve assembly 44.

The closure member 40 has an attaching bracket 50 secured thereto by weldments. The bracket 50 permits the pressure tube 12, foot valve assembly 44 and the other shock absorber components not connected to the piston rod 24 to be secured to an unsprung suspension component. As previously explained, the piston rod 24 is secured to a sprung suspension component.

A cup-shaped stop guide 52 is secured to the end of the piston rod 24 and has its mouth facing upwardly. The head 26 has an axially extending portion 54 provided with a circumference ring groove 56. A sealing ring 58 is seated in the groove 56. Referring to FIGURES 2 and 3, it is seen that the ring 58 is not continuous, but rather is provided with a gap 60. In addition, it has a series of notches 62 on its lower edge. The inner diameter of the ring 58 is greater than the diameter of the depth of the groove 56. Its outer diameter is normally greater than the inner diameter of the cup-shaped stop guide 52.

During normal shock absorber operation, the piston assembly 18 traverses only the mid-region of the pressure tube 12 and the hydraulic stop structure does not come into operation. Dampening for minor deflections is provided by the control valving of the piston 18 and the foot valve 44.

In the event of an extreme rebound deflection, the stop guide 52 will be engaged by the axial extension 54 of the head piece 26. The ring 58 will come into sealing engagement with the inner wall of the guide 52. As the members 52 and 54 telescope together, fluid will be trapped therebetween and force the ring 58 to seat on the upper surface of the groove 56. The only escape for fluid will be through the gap 60 and it will be reduced in size by the contraction of the ring 58 to comply with the internal size of the guide 52. Thus, the periphery of the ring 58 will be in sealed engagement with the inner surface of the guide 52 and also with the upper face of the groove 56.

Due to the trapping of hydraulic fluid, a hydraulic lock will be created. With only escape being the limited area of gap 60, the pressure build-up will be rapid and substantial. The end result will be an arresting of relative movement between the sprung and unsprung suspension components.

Means are provided to decrease the size of the gap 60 of the ring 58. The coefficient of heat expansion of the specific material of the ring 58 is selected to be higher than that of the material of the stop guide 52. As an example, the ring 56 may be formed of nylon and the stop guide 52 may be formed of steel. Thus, the arresting force will not drop at an elevated temperature where the viscosity of the oil decreases.

Changing the design width of gap 60 provides control of stop forces to meet the needs of various car weights and installation requirements.

At the very beginning of the compression stroke (see FIGURE 5) the ring 58 still presses against the inside wall of the stop guide 52. As the head 26 moves upwardly, the ring 58 moves until the bottom notched edge seats on the lower face of the ring groove 56. The hydraulic fluid above the ring 58 flows freely through the clearance between the upper edge of the ring groove 56 and the top of the ring 58. Fluid flow will occur around the back of the ring 58 and through the ports 62 to replenish fluid to the hydraulic stop chamber as the member 52 and 54 separate.

There is no build-up occurring in compression forces at the start of the return stroke. Without the unique ring seal 58 rapid replenishing of fluid to the area within the stop guide 52 would not be possible and a vacuum would be created.

The foregoing structure provides a hydraulic stop for extreme rebound. Means may also be provided for hydraulic stop upon extreme jounce. Such means include a cup-shaped stop guide 64 secured, with its mouth opened upwardly, to the base 38 of the pressure tube 12. The end of the piston rod 28 carries a head member 66 which telescopes within the stop guide 64.

Member 66 is provided with a circumferential ring groove 68 to receive a sealing ring 70. The ring 70 is identical in construction to the ring 58. The hydraulic stop upon extreme jounce occurs with the trapping of fluid within the stop guide 64 in a fashion identical to the mechanism disclosed in FIGURES 4 and 5. The unusual configuration of the ring 70 permits a prompt replenishing of fluid upon reversing of stroke direction.

The foregoing description presents the preferred embodiments of this invention. Modifications and alternate structures may occur to those skilled in the art which will come within the scope and spirit of the following claims.

We claim:

1. In a hydraulic shock absorber, a hydraulic stop mechanism having telescopic parts adapted to trap shock absorber fluid, a groove in one of said parts, a sealing ring positioned in said groove and adapted to sealingly engage the other of said parts, said ring having a constantly open first fluid flow path, said ring having a second fluid flow path adapted to be closed by fluid pressure in one direction and to be opened by fluid pressure in another direction, said ring having a radial groove in one end face to provide said second fluid flow path.

2. In a hydraulic shock absorber, a hydraulic stop mechanism having telescopic parts adapted to trap shock absorber fluid, a groove in one of said parts, a sealing ring positioned in said groove and adapted to sealingly engage the other of said parts, said ring having a constantly open first fluid flow path, said ring having a second fluid flow path adapted to be closed by fluid pressure in one direction and to be opened by fluid pressure in another direction, said ring having a gap in its periphery to provide said first fluid flow path and a radial groove in one end face to provide said second fluid flow path.

3. In a hydraulic shock absorber, a hydraulic stop mechanism having telescopic parts adapted to trap shock absorber fluid, a groove in one of said parts, a sealing ring positioned in said groove and adapted to sealingly engage the other of said parts, said ring having a constantly open first fluid flow path, said ring having a second fluid flow path adapted to be closed by fluid pressure in one direction and to be opened by fluid pressure in another direction, said ring having a gap in its periphery to provide said first fluid flow path and a radial groove in one end face to provide said second fluid flow path, said ring having a substantially greater coefficient of expansion than said parts.

4. In a hydraulic shock absorber having a casing, a piston and piston rod assembly slidably received in said casing, hydraulic fluid in said casing, the improvement comprising a hydraulic stop mechanism having telescopic parts adapted to trap hydraulic fluid and arrest relative movement in one direction between said assembly and said casing, said mechanism comprising a cup part secured to one of said casing and said assembly, a second part adapted to be telescopically received in said cup part secured to the other one of said casing and said assembly, one of said parts having an annular groove, an annular valve element positioned in said groove and adapted to engage the other of said parts, said groove having a greater width than said valve element, said element being axially slidable in said groove between sealed and open positions, said element being forced by fluid pressure to said sealed position in said groove when said parts are moving towards each other so that fluid will be trapped within said cup part, said element being forced by fluid pressure to said open position within said groove when said parts are moving away from each other to permit unrestricted communication with the interior of said cup part.

References Cited in the file of this patent

UNITED STATES PATENTS

| | | |
|---|---|---|
| 2,369,007 | Beecher | Feb. 6, 1945 |
| 2,507,266 | Patriquin | May 9, 1950 |
| 2,606,630 | Rossman | Aug. 12, 1952 |
| 2,783,859 | Patriquin | Mar. 5, 1957 |
| 2,819,064 | Peras | Jan. 7, 1958 |
| 2,907,414 | Patriquin | Oct. 6, 1959 |
| 2,924,304 | Patriquin | Feb. 9, 1960 |
| 2,984,321 | Schultze | May 16, 1961 |

FOREIGN PATENTS

| | | |
|---|---|---|
| 691,477 | Great Britain | May 13, 1953 |
| 794,304 | Great Britain | Apr. 30, 1958 |